US010739312B2

(12) United States Patent
Elmose et al.

(10) Patent No.: US 10,739,312 B2
(45) Date of Patent: Aug. 11, 2020

(54) ULTRASONIC INSPECTION APPARATUS FOR A SPHERICAL BODY

(71) Applicants: Siemens Gamesa Renewable Energy A/S, Brande (DK); Eclipse Scientific Products Inc., Waterloo (CA)

(72) Inventors: Soeren Forbech Elmose, Bording (DK); Björn Pedersen, Ansager (DK); Michael Wright, Kitchener (CA)

(73) Assignees: SIEMENS GAMESA RENEWABLE ENERGY A/S (DK); ECLIPSE SCIENTIFIC PRODUCTS INC. (CA)

( * ) Notice: Subject to any disclaimer, the term of this patent is extended or adjusted under 35 U.S.C. 154(b) by 245 days.

(21) Appl. No.: 15/573,777

(22) PCT Filed: Jun. 1, 2015

(86) PCT No.: PCT/EP2015/062158
§ 371 (c)(1),
(2) Date: Nov. 13, 2017

(87) PCT Pub. No.: WO2016/192770
PCT Pub. Date: Dec. 8, 2016

(65) Prior Publication Data
US 2018/0149620 A1 May 31, 2018

(51) Int. Cl.
G01N 29/04 (2006.01)
G01N 29/275 (2006.01)
(Continued)

(52) U.S. Cl.
CPC ......... *G01N 29/043* (2013.01); *G01N 29/225* (2013.01); *G01N 29/2456* (2013.01);
(Continued)

(58) Field of Classification Search
CPC .... G01N 29/225; G01N 29/265; G01N 29/27; G01N 29/275; G01N 2291/052;
(Continued)

(56) References Cited

U.S. PATENT DOCUMENTS 3,803,904 A * 4/1974 Diem ...................... G01N 29/26
73/640
4,281,548 A * 8/1981 Kober .................... G01N 29/27
73/593
(Continued)

FOREIGN PATENT DOCUMENTS

CN 102003951 A * 4/2011
CN 102003951 A 4/2011
(Continued)

OTHER PUBLICATIONS

Machine Translation JPH07244028 (Year: 2019).*
(Continued)

*Primary Examiner* — David L Singer
(74) *Attorney, Agent, or Firm* — Schmeiser, Olsen & Watts LLP

(57) ABSTRACT

A spherical body inspection apparatus including a support arrangement realized to support a spherical body during an inspection procedure; a probe arrangement comprising a plurality of ultrasonic testing probes arranged about the spherical body such that the ultrasonic testing probes target a common test point at the surface of the spherical body; and a displacer for effecting at least one relative rotational displacement between the spherical body and the probe arrangement. Also described is a method of inspecting a spherical body.

13 Claims, 5 Drawing Sheets

Figure 1:
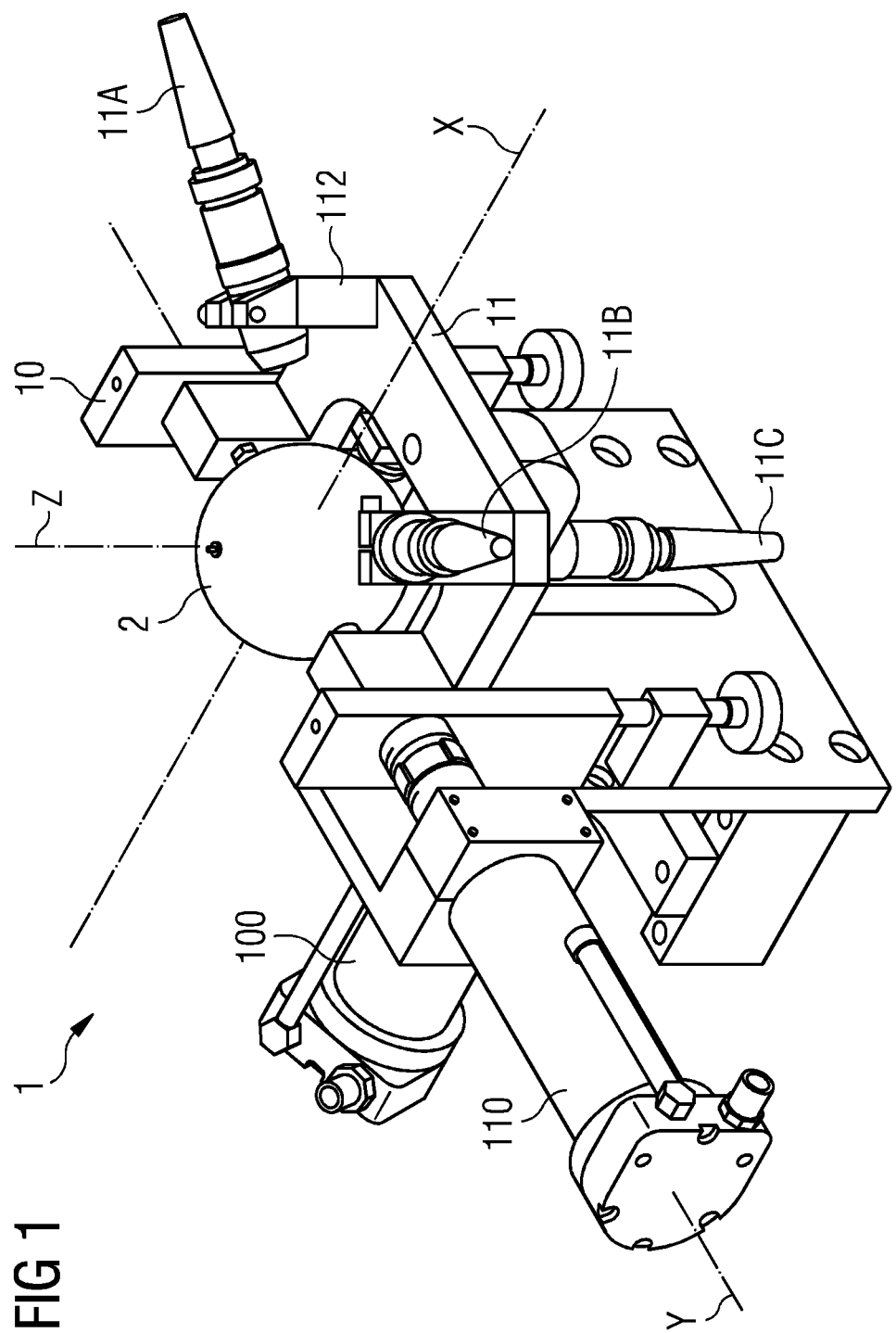

(51) Int. Cl.
*G01N 29/28* (2006.01)
*G01N 29/22* (2006.01)
*G01N 29/24* (2006.01)
*G01N 29/34* (2006.01)

(52) U.S. Cl.
CPC .......... *G01N 29/275* (2013.01); *G01N 29/28* (2013.01); *G01N 29/343* (2013.01); *G01N 2291/011* (2013.01); *G01N 2291/015* (2013.01); *G01N 2291/044* (2013.01); *G01N 2291/0421* (2013.01); *G01N 2291/0422* (2013.01); *G01N 2291/0428* (2013.01); *G01N 2291/056* (2013.01); *G01N 2291/105* (2013.01); *G01N 2291/265* (2013.01); *G01N 2291/2696* (2013.01)

(58) Field of Classification Search
CPC ....... G01N 2291/055; G01N 2291/056; G01N 2291/057; G01N 2291/265; G01N 2291/2696
See application file for complete search history.

(56) References Cited

U.S. PATENT DOCUMENTS

| | | | | |
|---|---|---|---|---|
| 4,387,596 | A | | 6/1983 | Fenkner et al. |
| 4,801,020 | A | * | 1/1989 | Rogne ................. G01B 5/0002 209/538 |
| 4,969,361 | A | * | 11/1990 | Kawasaki .............. G01N 29/26 209/538 |
| 5,195,372 | A | | 3/1993 | Fushimi et al. |
| 5,398,551 | A | * | 3/1995 | Kawasaki .......... G01N 29/2456 73/593 |
| 2009/0019937 | A1 | * | 1/2009 | Deemer ............... G01N 29/041 73/660 |
| 2009/0282924 | A1 | * | 11/2009 | Gotz .................... G01N 29/221 73/641 |
| 2014/0318251 | A1 | * | 10/2014 | Chatellier .............. G01N 29/07 73/597 |
| 2015/0198565 | A1 | * | 7/2015 | Chatellier .............. G01N 29/04 73/597 |

FOREIGN PATENT DOCUMENTS

| | | | | |
|---|---|---|---|---|
| JP | 07244028 A | * | 9/1995 | ............. G01N 29/11 |
| JP | H07 244 028 A | | 9/1995 | |
| WO | WO-0043769 A1 | * | 7/2000 | ............. G01N 29/22 |

OTHER PUBLICATIONS

International Search Report and Written Opinion for PCT Application No. PCT/EP2015/062158, dated Feb. 19, 2016.
Non-English Chinese Office Action for Application No. 201580080602.5, dated Oct. 21, 2019.

* cited by examiner

ULTRASONIC INSPECTION APPARATUS FOR A SPHERICAL BODY

CROSS-REFERENCE TO RELATED APPLICATIONS

This application claims priority to PCT Application No. PCT/EP2015/062158, having a filing date of Jun. 1, 2015, the entire contents of which are hereby incorporated by reference.

FIELD OF TECHNOLOGY

The following describes an inspection apparatus for a spherical body, and a method of inspecting a spherical body.

BACKGROUND

Ultrasonic testing (UT) is a widely used non-destructive testing technique to perform quality checks on various materials in order to detect internal flaws or to perform quality control. Typically, a UT probe is a transducer that emits an ultrasonic pulse into the object under inspection, and detects a reflected pulse. In the absence of a defect in the path of the pulse, the pulse will be reflected from the far boundary of the object, and will have a characteristic amplitude. A defect in the path of the pulse will result in a pulse reflected by the defect. The reflected pulse returns to the probe where it is detected.

UT inspection works very well for an object with relatively flat surfaces. Not all objects are suited to this type of inspection, for example it is more difficult to achieve a high level of accuracy when inspecting objects that have rounded surfaces.

However, it can be necessary to ensure the quality of a spherical object such as a steel bearing ball. A ball bearing can only function properly when the surfaces of the race and the surfaces of each bearing ball are smooth and free of defects. Small bearing balls can be manufactured relatively easily to a high standard. Larger bearing balls are more difficult to manufacture to the required standards since their larger dimensions increase the likelihood of surface defects. Therefore, much effort is invested in the inspection of such bearing balls, and an inspection procedure with a high probability of detection (PoD) rate is necessary to ensure that a flawed bearing ball does not make it through quality control. A visual inspection is slow and limited to the detection of evident defects such as pits or cracks in the outer surface. Such bearing balls would be discarded. However, a disadvantage of visual inspection is that a potentially problematic internal defect may escape detection. An internal defect located close to the surface of a bearing ball may later open up. An open defect can subsequently lead to seizure of the bearing and failure of the machine. In the case of large machine such as a wind turbine generator weighing several tons, failure of the ball bearing and subsequent repair can be very costly. Therefore, inspection of the components of such a large ball bearing may involve other techniques such as eddy current testing or UT inspection. However, when the known techniques of UT inspection are applied to a spherical body, the behavior of the pulses in the spherical body makes it difficult to interpret the reflections, so that a reliable inspection is not possible. Furthermore, the known techniques are not suited to detecting defects or flaws at or near the surface of a sphere.

SUMMARY

An aspect relates to providing an improved way of inspecting such a spherical body.

According to embodiments of the invention, the spherical body inspection apparatus comprises a support arrangement realized to support a spherical body during an inspection procedure; a probe arrangement comprising a plurality of UT probes arranged about the spherical body such that the UT probes target a common test point at the surface of the spherical body; and a displacement means or displacer for effecting at least a rotational displacement of the spherical body relative to the probe arrangement.

In the context of embodiments of the invention, a UT probe is a probe of the type generally used for UT inspection. A UT probe generally has a working surface with a piezo-electric transducer for emitting and detecting ultrasonic waves. An ultrasonic wave generally a high frequency pulsed wave will diverge slightly as it travels through the object under test. In the context of embodiments of the invention, therefore, the "test point" targeted by a UT probe is to be understood as the area or region, at the object boundary, that is covered by the ultrasonic wave.

An advantage of the inspection apparatus according to embodiments of the invention is that a test point at the surface of the spherical body is targeted simultaneously by at least two UT probes. This significantly increases the sensitivity of the testing, and increases the accuracy of the inspection by increasing the likelihood of detecting a flaw, defect or anomaly at or close to the surface of the spherical body. Furthermore, test coverage can be favourably high owing to the relative rotational displacement of the spherical body and the probe arrangement.

According to embodiments of the invention, the method of inspecting a spherical body comprises the steps of arranging a plurality of UT probes relative to the spherical body to target a common test point at the surface of the spherical body; and then actuating the UT probes to each emit an ultrasonic pulse into the spherical body while effecting at least one relative rotation of the spherical body relative to the probe arrangement.

An advantage of the method according to embodiments of the invention is that it can quickly perform a thorough inspection of the spherical body, with a high probability of detection of any defect at the surface of the spherical body. The method is therefore particularly suited to the inspection of spherical bodies that must be manufactured to a high degree of quality.

Particularly advantageous embodiments and features of the invention are given, as revealed in the following description. Features of different categories may be combined as appropriate to give further embodiments not described herein.

In the following, without restricting embodiments of the invention in any way, it may be assumed that the spherical body under inspection is a solid body such as a steel ball for a large ball bearing, and the terms "spherical body", "sphere", bearing ball" and "ball" may therefore be used interchangeably. The terms "anomaly", "flaw", "defect" and "indication" as used in embodiments of the invention are synonymous and refer to an imperfection, close to or at the surface of the spherical body, that could lead to problems if not detected.

Preferably, the inspection apparatus according to embodiments of the invention is realized for use in an immersion tank. The tank may be filled with any suitable couplant such as water and an amount of anti-corrosive chemical.

In a preferred embodiment of the invention, the displacement means or displacer comprises two distinct arrangements for effecting a relative rotation between the spherical body and the probe arrangement. Preferably, a relative rotation is performed about a central axis of the spherical body. In a particularly preferred embodiment of the invention, the displacement means or displacer comprises a rotation means or rotator realized to rotate the spherical body about a first axis of the spherical body and/or a probe displacement means or displacer realized to displace the probe arrangement relative to the spherical body. In a particularly preferred embodiment of the invention, both a rotation means or rotator and a probe displacement means or displacer are used and simultaneously operated so that the spherical body is rotated about one central axis, while the probe arrangement is being rotated about another central axis of the spherical body.

The relative rotation of the spherical body about the first axis ensures that the succession of test points describes a path over the surface of the spherical body. In a preferred embodiment of the invention, the probe displacement means or probe displacer is realized to simultaneously rotate the probe arrangement about another, different axis of the spherical body. This additional displacement ensures that the path followed by the succession of test points covers more of the surface of the spherical body. The greater coverage of the inspection surface of the spherical body leads to the favorably high PoD for the inventive technique.

In a particularly preferred embodiment of the invention, the first axis and the second axis are orthogonal axes passing through the center of the bearing ball, i.e. the first and second axis are axes of a 3D Cartesian space with its origin at the center of the bearing ball. As a result, a path comprising a series of test points describes a loxodrome on the spherical body. A loxodrome is a spherical spiral path over the surface of the spherical body, from one pole to the diametrically opposite pole.

In a preferred embodiment of the invention, the inspection apparatus comprises a controller realized to control the rates of rotation of the rotating means or rotator and the probe displacement means or displacer. By choosing an appropriate rate of rotation of the bearing ball and an appropriate rate of displacement of the probe arrangement, the path followed by the targeted test points can be made favorably "dense". For example, by moving the probe arrangement relatively slowly compared to the rotation of the bearing ball, neighboring sections of the spherical spiral path or loxodrome will be close together, giving good inspection coverage. Therefore, the rates of rotation/displacement are preferably set by the controller to achieve a favorably long pole-to-pole length of the loxodrome path traveled by the targeted test points. In one preferred embodiment of the invention, the probe arrangement is moved through 0.5° for every complete revolution of the spherical body about the first axis. A complete loxodrome can be traced by the targeted test points by spinning the bearing ball about the first axis and rotating the probe arrangement about the second orthogonal axis through a space containing one hemisphere of the bearing ball.

The rate of rotation of the spherical body and the rate of displacement of the probe arrangement are chosen to achieve an essentially complete coverage of the surface of the spherical body by a path described by the test points on the surface of the spherical body. A favorably uniform coverage can be ensured by adjusting the rate of rotation of the bearing ball according to the momentary position of the probe arrangement. For example, when the probe arrangement is targeting a test point near a pole of the loxodrome, the bearing ball can be rotated at a relatively fast rate; and when the probe arrangement is targeting a test point near the "equator" of the loxodrome, the bearing ball can be rotated at a relatively slow rate. By adjusting the rotation rate in this way, the rate of travel of the test point can remain essentially constant. These and other aspects will be explained in detail with the aid of the diagrams.

Preferably, the probe arrangement of the inspection apparatus according to embodiments of the invention comprising UT probes that are arranged to achieve specific pulse behaviors. Preferably, the probe arrangement comprises a first UT probe arranged to emit a pulse along a diameter of the spherical body, and at least one second UT probe arranged to emit a pulse along a chord of the spherical body. Preferably, the first UT probe is held to effectively point at the center of sphere such that the pulse emitted by that UT probe enters the bearing ball at the targeted test point, travels on to the far side of the bearing ball as a longitudinal wave, and is reflected back as a longitudinal wave through the test point to the first UT probe. This first UT probe will be referred to as a "longitudinal UT probe" in the following.

In a particularly preferred embodiment of the invention, one or more second UT probes are arranged relative to the longitudinal UT probe such that a pulse emitted by a second UT probe is refracted upon entry into the spherical body to travel as a transverse wave along a chord to the targeted test point on the far side of the bearing ball, and is reflected back as a transverse wave from the test point to the point of entry, and undergoes conversion once again to a longitudinal wave on its path back to the working surface of the UT probe. Such a second UT probe will be referred to as a "transverse UT probe" in the following. Preferably, two transverse UT probes are used in conjunction with a longitudinal UT probe. The probe arrangement in this preferred embodiment preferably comprises a symmetrical arrangement, with the longitudinal UT probe in the center, flanked on each side by a transverse UT probe. All three probes target the same test point on the inspection surface. The use of two transverse UT probes favorably raises the probability of detection of targets that are angled, i.e. directionally sensitive. This preferred probe arrangement can view all angles of a defect or indication, so that the indication will always be at a maximum reflected angle with respect to at least one of the probes during an inspection.

A UT probe initially generates an ultrasonic wave as a longitudinal wave (also referred to as a pressure wave), i.e. the ultrasonic wave leaves the working surface and passes through the couplant as a longitudinal wave. When the UT probe is arranged along a normal to the surface of the object under inspection, the pulse will continue as a longitudinal wave through the object. Embodiments of the invention make use of the refraction that occurs when a longitudinal ultrasonic wave enters the body at an angle to the normal. By arranging a longitudinal UT probe to emit a longitudinal wave through a test point along a diameter of the spherical body, and aligning a further transverse UT probe such that its path of travel (along a chord) intersects the path of travel of the pulse emitted by the longitudinal UT probe at the test point, more detailed data can be collected for the targeted test point.

According to embodiments of the invention, the targeted test point is the point of reflection of a pulse from a transverse UT probe, as well as being the point of entry/exit of a pulse from the longitudinal UT probe. By arranging the longitudinal UT probe and one or more transverse UT probes in this manner, the inspection sensitivity can be significantly increased, since several UT probes are simultaneously collecting information from a single targeted test point.

Preferably, the inspection apparatus according to embodiments of the invention comprises an acquisition unit for recording the reflected ultrasonic signals detected by the UT probes. The acquired data can be analyzed in real-time and/or can be stored for analysis at a later point. Preferably, the inspection apparatus according to embodiments of the invention comprises an analysis unit for analyzing the recorded ultrasonic signals to determine the presence of an anomaly in the spherical body. Alternatively or in addition, the recorded ultrasonic signals can be rendered by an appropriate module of a graphical user interface to allow a visual interpretation of the information.

There are a number of ways of defining a probe position so that its longitudinal wave is converted to a transverse wave (also referred to as a shear wave) upon entry. In a preferred embodiment of the invention, the probe arrangement can be realized to hold a transverse UT probe such that a long axis of that UT probe is parallel to a central axis or diameter of the bearing ball, and offset by a predetermined distance from that central axis. For example, a 14 mm offset has been observed to result in a 45° shear wave through a 60 mm steel bearing ball.

However, in a particularly preferred embodiment of the invention, the probe arrangement can be realized to hold a transverse UT probe such that a long axis of that UT probe subtends a predetermined angle relative to a central axis of the spherical body. This predetermined angle is the angle of incidence associated with the desired angle of refraction, according to Snell's law, and may apply to a steel ball of any diameter. For example, an angle of 18.8° subtended between a central axis and the transverse UT probe has been observed to result in a favourable 45° shear wave through a steel bearing ball.

The offset or subtended angle is preferably determined on the basis of a desired refraction angle of the transverse wave. Other parameters may determine the offset or subtended angle, for example the density of the bearing ball.

In a particularly preferred embodiment of the inspection apparatus according to embodiments of the invention, a UT probe comprises a focused UT probe having a focal length, and the probe arrangement is realised to hold that UT probe at a distance from the spherical body corresponding essentially to the focal length. For example, a 10 MHz 50 mm focused UT probe can be used. The longitudinal UT probe and the transverse UT probe(s) can be of the same type, e.g. each can be a 10 MHz 50 mm focused probe. Alternatively, the longitudinal UT probe and the transverse UT probe(s) can be of different types. For example, a transverse UT probe can have a different frequency and/or a different focal length from the longitudinal UT probe. When two or more transverse UT probes are used, their frequencies and/or focal lengths can be the same, or can be different. However, in a particularly preferred embodiment of the invention, the probe arrangement comprises a set of identical or matched UT probes. This maximizes the inspection sensitivity and results in a favourably high PoD. The frequency of a probe determines the size of a defect that can be detected by that probe. For example, a probe with a certain frequency can detect a 1 mm defect when used as a longitudinal probe in the context of embodiments of the invention. When used as a transverse probe, that frequency allows detection of a 0.5 mm target on account of the altered velocity of the ultrasonic wave after refraction. Preferably, the frequency of the UT probes is chosen on the basis of the minimum defect size to be detected.

The UT probes can be held by the probe arrangement in any suitable configuration that allows a conjunction of the entry/exit point of the longitudinal UT probe and the internal reflection point(s) of the transverse UT probe(s) as described above. In a preferred embodiment of the invention, the UT probes are held in a symmetrical arrangement, for example with the longitudinal UT probe in a plane defined by the first and third axes of the 3D Cartesian space, and with each transverse UT probe held at one angle relative to the longitudinal UT probe, and held at another angle relative to the plane containing the longitudinal UT probe.

The effects of the various parameters for an inspection setup can be modelled using appropriate modelling software to determine a suitable probe arrangement.

BRIEF DESCRIPTION

Figure 2:
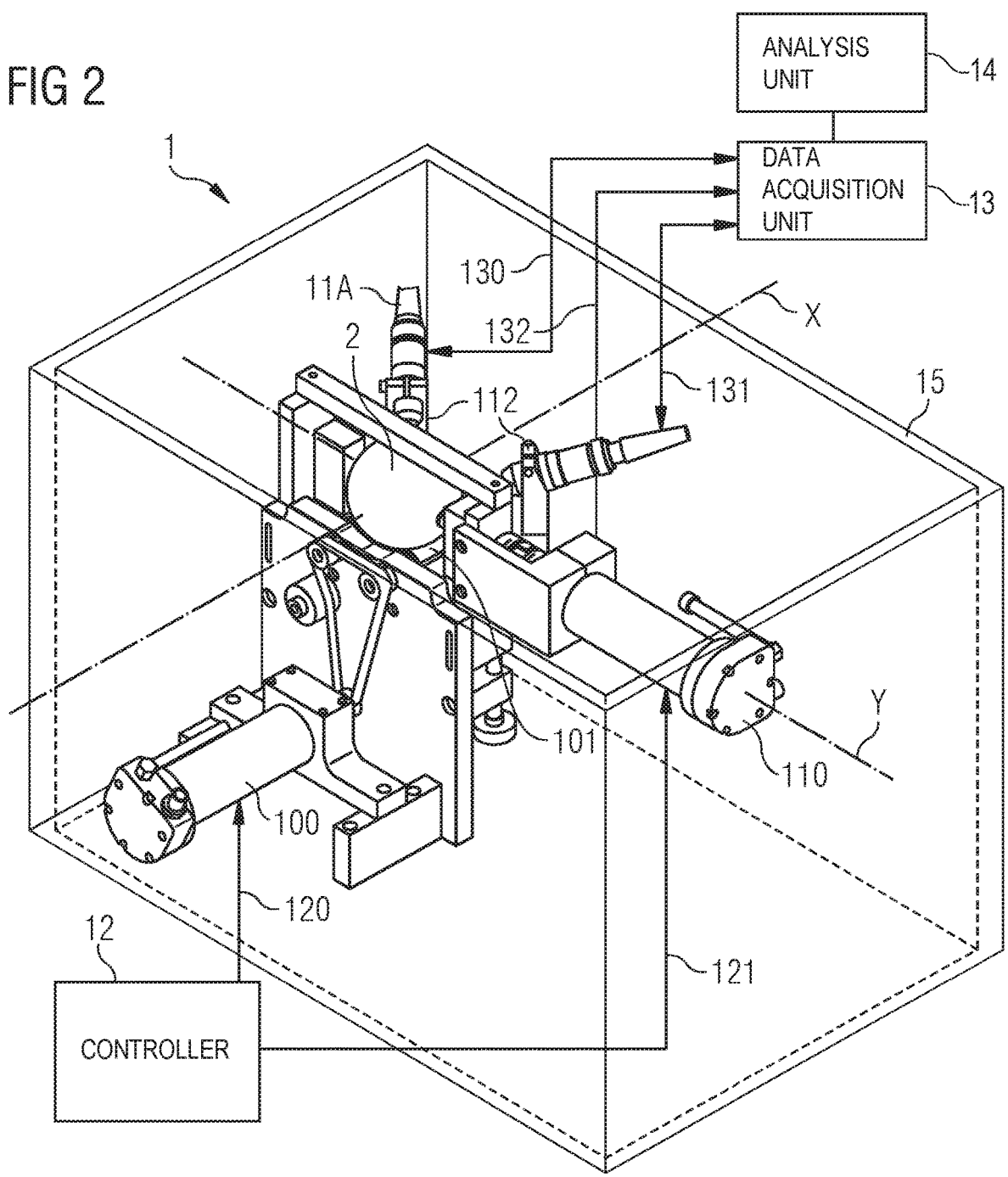
Figure 3:
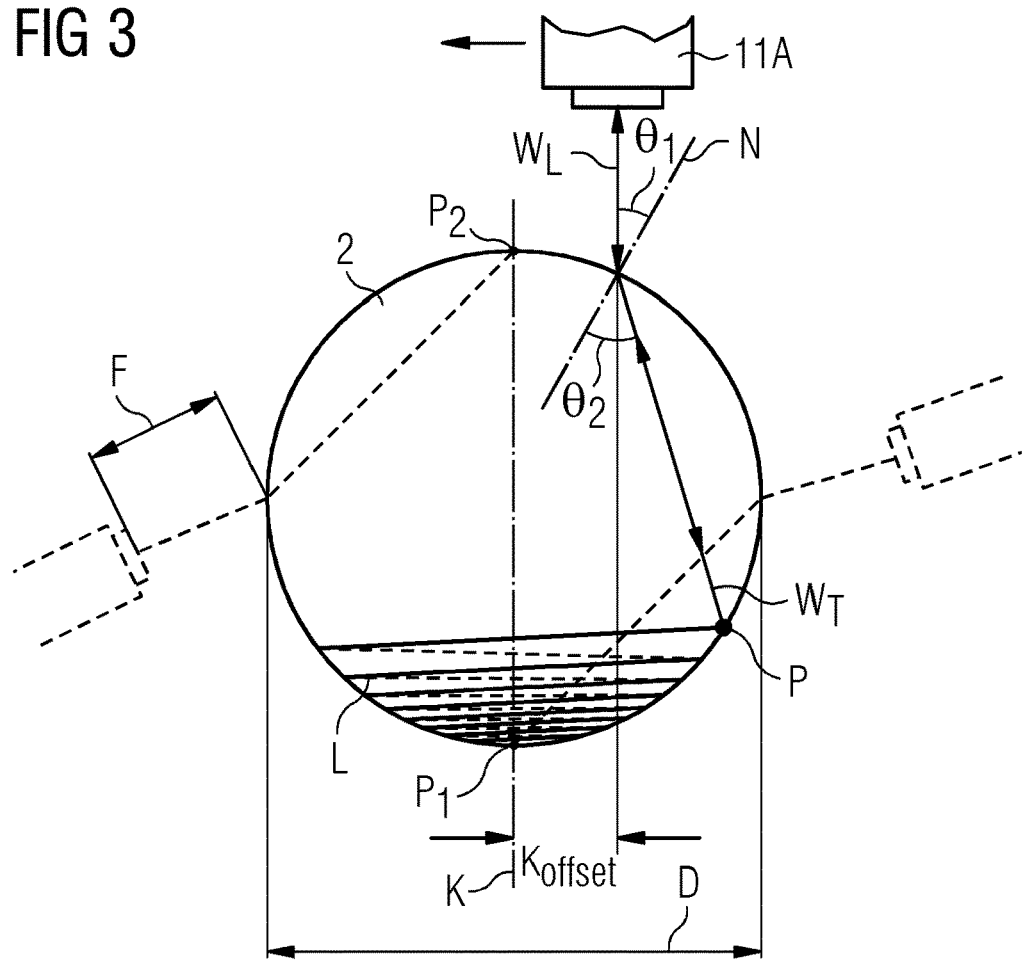
Figure 4:
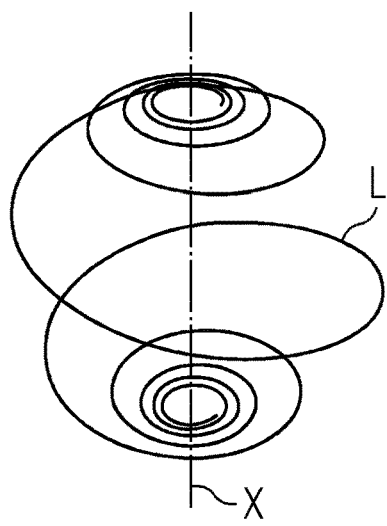
Figure 5:
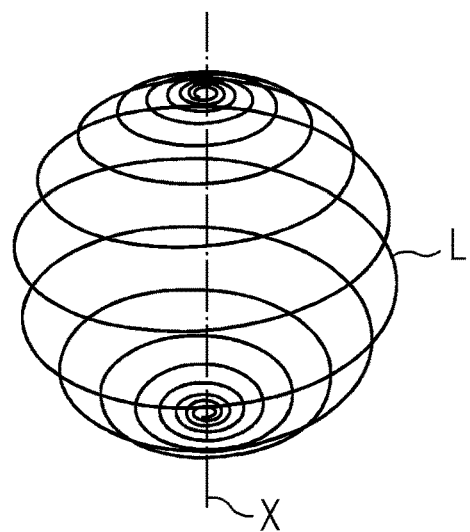
Figure 6:
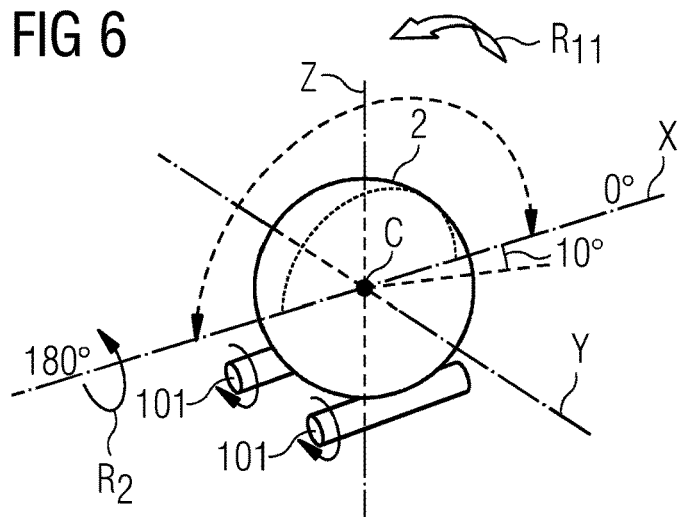
Figure 7:
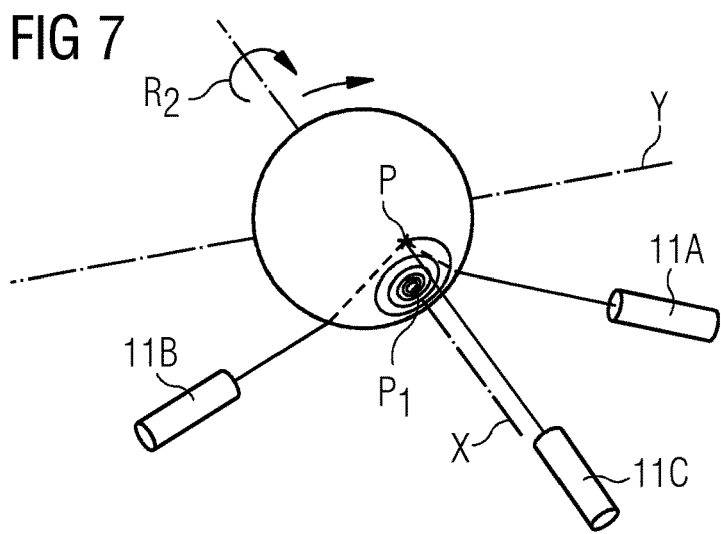
Figure 8:
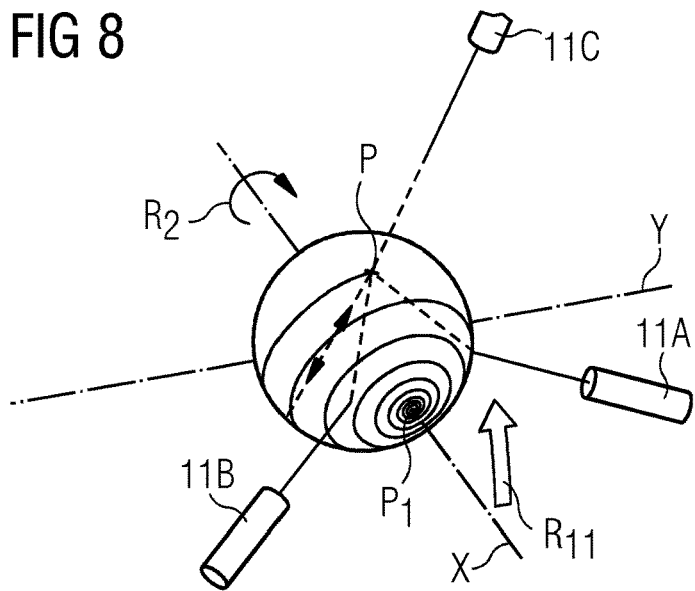
Figure 9:
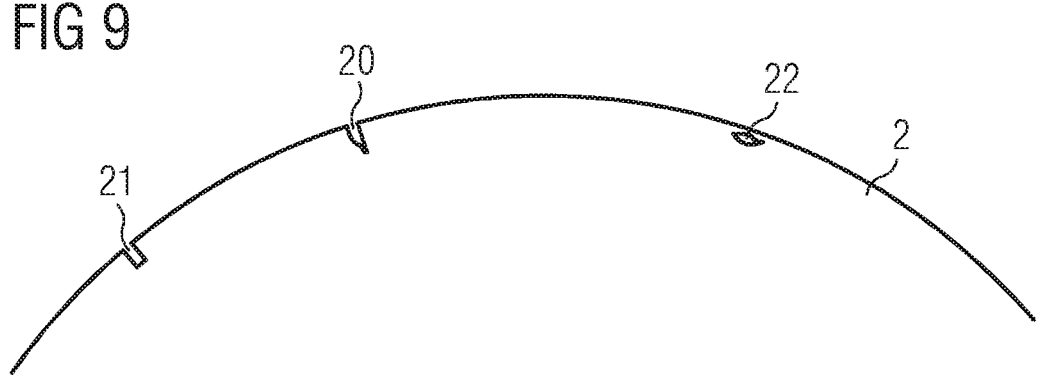
Figure 10:
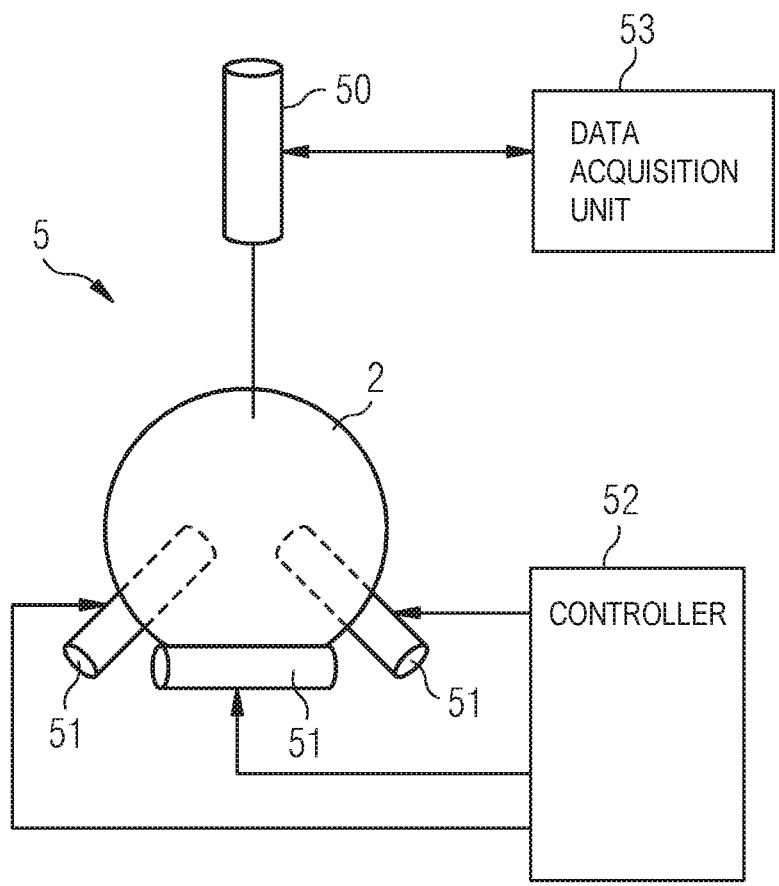

Some of the embodiments will be described in detail, with reference to the following figures, wherein like designations denote like members, wherein:

FIG. 1 shows an embodiment of an inspection apparatus;
FIG. 2 shows a further view of the inspection apparatus of FIG. 1;
FIG. 3 is a schematic drawing of a transverse ultrasonic wave through a spherical body;
FIG. 4 shows a first path of targeted test points described on a spherical body during an inspection method;
FIG. 5 shows a second path of targeted test points described on a spherical body during an inspection method;
FIG. 6 shows a portion of an embodiment of an inspection apparatus;
FIG. 7 shows a first instant during an inspection method;
FIG. 8 shows a second instant during an inspection method;
FIG. 9 shows exemplary anomalies in a steel bearing ball that may be detected by the inspection apparatus;
FIG. 10 shows a known art bearing ball inspection setup.

In the diagrams, like numbers refer to like objects throughout. Objects in the diagrams are not necessarily drawn to scale.

DETAILED DESCRIPTION

FIGS. 1 and 2 show two views of an embodiment of an inspection apparatus 1 according to embodiments of the invention. A steel bearing ball 2 is supported in a support arrangement 10. Three UT probes 11A, 11B, 11C of a probe arrangement are held in a configuration to point at the bearing ball 2 such that they target a common test point on the surface of the ball 2. One probe 11C is a "longitudinal" UT probe 11C, i.e. it is held to emit an ultrasonic pulse that will travel through the ball 2 as a longitudinal pulse. The other two probes 11A, 11B are "transverse" UT probes 11A, 11B, i.e. these are held to emit an ultrasonic pulse that will be refracted upon entry into the ball 2 to result in a transverse wave. A probe holding arrangement comprises a wing 11 to which are mounted a number of jigs 112. Each jig 112 holds its probe 11A, 11B, 11C in a predefined attitude relative to the sphere 2 to maintain the desired configuration of the probe arrangement throughout the inspection procedure, for example by ensuring a specific angle of incidence of the ultrasonic pulse to achieve a desired angle of refraction of the resulting shear wave or transverse wave.

The inspection apparatus 1 comprises a ball rotator 100, 101, which causes the ball 2 to rotate about a first axis X passing through the center of the ball 2. A probe displacement means or displacer 110 causes the wing 11 to rotate about a second axis Y that is orthogonal to the first axis X and also passes through the center of the ball 2.

These elements of the inspection apparatus can be placed in an immersion tank 15, as indicated in FIG. 2, which can be filled with water to act as a couplant during the inspection procedure. A further element of the inspection apparatus 1 is a controller 12 for controlling the rate of rotation of the bearing ball 2, and the rate of rotation of the wing 11. An appropriate combination of rotation rates can be chosen to achieve the desired level of coverage of the ball surface. The controller 12 can send appropriate commands 120, 121 to the ball rotation means or rotator 100 and probe displacement means or displacer 110 respectively. The skilled person will be familiar with such a setup. A further element of the inspection apparatus 1 is a data acquisition unit 13 for collecting and recording the reflected ultrasonic waves detected at the working surfaces of the UT probes 11A, 11B, 11C. To this end, the probes 11A, 11B, 11C can transfer probe data 130, 131, 132 to the data acquisition unit, e.g. over a network or wireless connection, as will be known to the skilled person. The acquired data can be analyzed in real-time and/or can be stored for analysis at a later point. Preferably, the inspection apparatus 1 according to embodiments of the invention includes an analysis unit 14 for analyzing the recorded ultrasonic signals to determine the presence of an anomaly in the spherical body 2. Alternatively or in addition, the recorded ultrasonic signals can be rendered by an appropriate module of a graphical user interface to allow a visual interpretation of the information.

FIG. 3 is a schematic drawing showing the path of a transverse ultrasonic wave $W_T$ through a spherical body 2 during an inspection method according to embodiments of the invention. The diagram shows a section through the sphere 2 in the plane containing one of two transverse probes of the probe arrangement 11A, 11B, 11C of FIGS. 1 and 2. This diagram also indicates a favorable distance F between the working surface of a probe and the surface of the ball 2. The distance F is the same as the focal length of a focused probe. All three UT probes 11A, 11B, 11C are preferably focused probes held at this distance F from the ball 2.

In this exemplary arrangement, a transverse probe 11A is held such that the initially longitudinal ultrasonic wave $W_L$ subtends an angle of incidence $\theta_1$ to a normal N to the surface of the ball 2. This results in an angle of refraction $\theta_2$ of the ultrasonic wave on account of the difference in density at the boundary between the couplant and the bearing ball 2. An angle of refraction $\theta_2$ of 45° has been observed during tests to result in an optimum shear wave amplitude at the far boundary, i.e. at the targeted test point P. The shear wave $W_T$ is reflected at the test point P and travels back to the entry point, where it undergoes refraction once again and conversion to a longitudinal wave, and is subsequently detected at the working surface of the transverse probe 11A. Any flaw or anomaly in the vicinity of the targeted test point P will appear in the detected signal as a departure from the expected pulse arrival time and amplitude. During the inspection procedure, the ball 2 is rotated about an axis above while the probe arrangement is moved about the rotating ball 2. The arrow in the diagram indicates the rotational displacement of this probe 11A relative to the bearing ball 2.

The diagram also shows an initial position and a final position of the transverse probe 11A (dotted lines) for targeted test points at initial and final poles $P_1$, $P_2$ of a spherical spiral or loxodrome traced by the test points during the inspection procedure. The angle of incidence $\theta_1$ of the transverse probe 11A remains the same throughout the inspection procedure. For the sake of clarity, the diagram does not show the longitudinal probe 11C and the other transverse probe 11B, since these do not lie in the plane of the page, and it may be assumed that pulses emitted by these other probes 11B, 11C meet at the targeted test point P. The other transverse probe 11B is also held at the desired angle of incidence $\theta_1$ as described above.

A portion of a loxodrome L already traced by the targeted test points P (under rotation of the ball and probe arrangement) commencing at an initial pole P1 is indicated as a projection in the lower part of the diagram. The density of the loxodrome L is determined by the rotational speed of the ball and/or the displacement speed of the probe arrangement.

In an alternative approach, the desired refraction angle could be achieved by holding a transverse probe 11A such that its long axis is parallel to a central axis K of the bearing ball 2, but offset from that axis K by a predefined distance $K_{offset}$ as indicated in the diagram. The angle of refraction will increase as the offset increases. For an offset of 0 mm, no refraction occurs. For a steel bearing ball 2 with a diameter D of 60 mm, an offset of 14 mm has been found to result in the favorable angle of refraction $\theta_2$ of 45°.

FIG. 4 shows a loxodrome L that might be described on a bearing ball by a succession of targeted test points during an inspection method according to embodiments of the invention. Here, the loxodrome L is relatively open, as might be achieved by a relatively rapid motion of the probe arrangement. FIG. 5 shows a loxodrome L which is tighter or more dense, indicating the effect of a slower displacement of the probe arrangement. Experiments have shown that a probe displacement of 0.5° for every complete rotation of the bearing ball 2 can achieve an essentially complete coverage of a bearing ball with a diameter in the range of 50-80 mm.

FIG. 6 schematically indicates part of an inspection apparatus 1 according to embodiments of the invention. The diagram indicates a possible realization of the support arrangement and rotation means or rotator. Here, the ball 2 rests on two pins 101 which are synchronously turned by some suitable driving means or driver (FIG. 2 shows a drive belt arrangement). The pin rotation causes the bearing ball 2 to rotate in the opposite direction about its X axis. This diagram also shows all three axes X, Y, Z of a 3D Cartesian space with its origin at the centre of the sphere 2. During an inspection procedure, as the bearing ball 2 rotates about the X axis, a probe arrangement (not shown) can be displaced along a curved path as indicated by the arrow $R_{11}$, such that the test point momentarily being targeted lies along a vertical semi circle (broken line) in the upper hemisphere of the ball 2. Since the ball 2 is being rotated relatively rapidly about the X axis as indicated by the arrow $R_2$, the previously targeted test points describe a spherical spiral L as indicated in the diagram. The probe arrangement can be moved from 0° to 180° along a semi-circular path as indicated in the diagram. To ensure an even better coverage of the ball surface, the probe arrangement can be moved through 200°, with an additional 10° at either end of the 180° arc shown in the diagram.

FIG. 7 shows a first instant during an inspection method according to embodiments of the invention. The diagram shows a longitudinal probe 11C flanked by two transverse probes 11A, 11B in a symmetrical arrangement. Here, the position of each transverse probe 11A, 11B is fixed according to a predefined attitude such that the transverse waves $W_T$ arrive at the target point P defined by the point of entry/exit of the longitudinal wave $W_L$ emitted by the longitudinal UT probe 11C. The diagram shows the probe arrangement in a position to target a test point near a first pole $P_1$ of a loxodrome or spherical spiral. The successive test points already targeted have traced a portion of a virtual loxodrome as indicated in the diagram. The rates of rotation of ball 2 and probe arrangement 11A, 11B, 11C have been set to achieve a fairly dense loxodrome, giving good coverage of the ball surface. FIG. 8 shows a later instant during the inspection procedure. Here, the probe arrangement 11A, 11B, 11C has been gradually displaced in the direction $R_{11}$ while the bearing ball 2 has been rotated multiple times about its X axis as indicated by the arrow $R_2$. The diagram shows the spherical spiral L traced by the targeted test points P and completed to a greater extent.

FIG. 9 shows a cross-section through a steel bearing ball 2, showing exemplary anomalies or defects 20, 21, 22. One type of flaw 20 is a crack or tear at the surface. Another type of flaw is a pit 21 at the surface. These defects 20, 21 may be too small to be reliably detected by a visual inspection procedure, but can be large enough to have a detrimental effect on the performance of a bearing in which such a flawed ball 2 is used. A third type of flaw 22 is concealed below the surface and cannot be detected visually. If a ball with this kind of flaw 22 used in a bearing of a large machine, the flaw 22 can break open later on during operation of the machine, leading to poor performance or even seizure of the bearing. The inspection apparatus and method according to embodiments of the invention can reliably detect these and other similar kinds of defect, so that a high level of quality can be assured for any bearing that passes the inspection procedure.

FIG. 10 shows a perspective view of a known art inspection setup 5 for performing UT inspection of a bearing ball. A single longitudinal UT probe 50 is mounted to point through the centre of the bearing ball 2. A support arrangement holds the bearing ball 2 underneath the probe 50. A number of rollers 51 underneath the bearing ball 2 are turned to effect a random rotation of the bearing ball 2 while the UT probe 50 emits successive ultrasonic pulses and detects their reflections. A controller 52 issues control signals to the rollers 51 to coordinate their actuation. A data acquisition unit 53 collects date from the UT probe 50. In this known art arrangement, it is difficult to achieve a full coverage of the bearing ball surface on account of the random rotations.

Furthermore, the sensitivity of the single longitudinal probe 50 on its own is so low that only relatively large flaws can reliably be detected, and smaller but significant flaws of the type described in FIG. 9 can escape detection. Because only a longitudinal UT probe 50 is used, this prior art UT scanner arrangement cannot detect linear defects that are perpendicular, i.e. normal to the inspection surface. Small surface breaking cracks are defects that fall under this category, and would remain undetected, so that the prior art technique can only achieve an unfavorably low PoD. This kind of inspection arrangement is therefore associated with an unsatisfactory PoD level and is unsuited to the inspection of balls for a ball bearing intended to support a heavy machine such as a wind turbine generator.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A spherical body inspection apparatus comprising:
a support arrangement realized to support a spherical body during an inspection procedure;
a probe arrangement comprising a plurality of ultrasonic testing probes arranged about the spherical body such that the ultrasonic testing probes simultaneously target a common test point at the surface of the spherical body and at least one of the plurality of ultrasonic testing probes is arranged to emit an ultrasonic pulse that enters and exits the spherical body at the common test point and passes as a longitudinal wave through the spherical body and at least one other of the plurality of ultrasonic testing probes is arranged to emit an ultrasonic pulse that, after refraction into the spherical body, passes as a transverse wave along a chord of the spherical body to the common test point; and
a displacer for effecting at least one relative rotational displacement between the spherical body and the probe arrangement.

2. The inspection apparatus according to claim 1, wherein the displacer comprises a rotator realized to rotate the spherical body about a first axis of the spherical body and/or a probe displacer realized to rotate the probe arrangement about a second axis of the spherical body.

3. The inspection apparatus according to claim 2, wherein the first axis and the second axis are orthogonal axes passing through the centre of the spherical body such that successive test points describe a loxodrome on the spherical body.

4. The inspection apparatus according to claim 3, comprising a controller realized to control the rate of rotation of the spherical body and/or the rate of rotation of the probe displacer.

5. The inspection apparatus according to claim 1, wherein the at least one other of the plurality of ultrasonic testing probes is held to subtend a predetermined angle of incidence relative to a central axis of the spherical body to achieve a desired refraction angle.

6. The inspection apparatus according to claim 1, wherein an ultrasonic testing probe of the plurality of ultrasonic testing probes comprises a focused ultrasonic testing probe having a focal length, which ultrasonic testing probe is held at a distance from the spherical body corresponding essentially to the focal length of that ultrasonic testing probe.

7. The inspection apparatus according to claim 1, wherein the probe arrangement comprises a set of matched ultrasonic testing probes.

8. The inspection apparatus according to claim 1, further comprising an acquisition unit for recording reflected ultrasonic pulses detected by the ultrasonic testing probes.

9. The inspection apparatus according to claim 1, further comprising an analysis unit for analysing the recorded ultrasonic pulses to determine the presence of an anomaly in the spherical body.

10. The inspection apparatus according to claim 1, realized for use in an immersion tank.

11. A method of inspecting a spherical body, which method comprises:
arranging a probe arrangement comprising a plurality of ultrasonic testing probes relative to the spherical body such that the ultrasonic testing probes simultaneously target a common test point at the surface of the spherical body with at least one ultrasonic pulse that enters and exits the spherical body at the common test point and passes as a longitudinal wave through the spherical body and at least one ultrasonic pulse that, after refraction into the spherical body, passes as a transverse wave through the spherical body along a chord to the common test point; and
actuating the ultrasonic testing probes to emit the ultrasonic pulses while
effecting at least one relative rotational displacement between the spherical body and the probe arrangement of the ultrasonic testing probes.

12. The method according to claim 11, wherein a rate of rotation of the spherical body and a rate of displacement of the probe arrangement are chosen to achieve an essentially complete coverage of the surface of the spherical body by a path described by a succession of test points on the surface of the spherical body.

13. The method according to claim 11, wherein, in a first relative rotational displacement, the spherical body is rotated through a plurality of complete revolutions about a first axis while, in a second relative rotational displacement, the probe arrangement is displaced at least through a space containing one hemisphere of the spherical body.

* * * * *